(12) United States Patent (10) Patent No.: US 11,494,045 B2
Huang et al. (45) Date of Patent: Nov. 8, 2022

(54) ELECTRONIC APPARATUS AND OBJECT INFORMATION RECOGNITION METHOD BY USING TOUCH DATA THEREOF

(71) Applicant: Acer Incorporated, New Taipei (TW)

(72) Inventors: Chih-Wen Huang, New Taipei (TW); Eric Choi, New Taipei (TW); Wen-Cheng Hsu, New Taipei (TW); Chao-Kuang Yang, New Taipei (TW); Yen-Shuo Huang, New Taipei (TW); Ling-Fan Tsao, New Taipei (TW); Chueh-Pin Ko, New Taipei (TW); Chih-Chiang Chen, New Taipei (TW); Tai Ju, New Taipei (TW)

(73) Assignee: Acer Incorporated, New Taipei (TW)

( * ) Notice: Subject to any disclaimer, the term of this patent is extended or adjusted under 35 U.S.C. 154(b) by 518 days.

(21) Appl. No.: 16/721,796

(22) Filed: Dec. 19, 2019

(65) Prior Publication Data

US 2021/0117025 A1 Apr. 22, 2021

(30) Foreign Application Priority Data

Oct. 18, 2019 (TW) .................................. 108137617

(51) Int. Cl.
*G06F 3/0481* (2022.01)
*G06F 3/048* (2013.01)
(Continued)

(52) U.S. Cl.
CPC ............... *G06F 3/048* (2013.01); *G06N 3/08* (2013.01); *G06N 20/00* (2019.01); *G06V 10/955* (2022.01)

(58) Field of Classification Search
CPC .... G06F 3/048; G06F 3/04883; G06F 3/0418; G06F 3/04186; G06F 3/044; G06F 3/045;
(Continued)

(56) References Cited

U.S. PATENT DOCUMENTS 9,893,549 B2 * 2/2018 Borngräber ............. H02J 50/10
10,802,667 B1 * 10/2020 Ramasamy ......... G06F 3/04815
(Continued)

FOREIGN PATENT DOCUMENTS

AU 2009281762 A1 * 3/2011 ......... G06K 9/00369
AU 2014308590 A1 * 3/2016 ........... A61B 3/0025
(Continued)

*Primary Examiner* — Steven P Sax
(74) *Attorney, Agent, or Firm* — JCIPRNET

(57) ABSTRACT

An electronic apparatus and an object information recognition method by using touch data thereof are provided. Touch sensing is performed in the case where no object touches a touch panel to obtain a specific background frame through the touch panel. A current touch sensing frame is obtained through the touch panel. Touch background data of a plurality of first frame cells in the specific background frame is respectively subtracted from touch raw data of a plurality of second frame cells in the current touch sensing frame to obtain a background removal frame including a plurality of cell values. The background removal frame is transformed into a touch sensing image. The touch sensing image is inputted to a trained neural network model to recognize object information of a touch object.

10 Claims, 9 Drawing Sheets

(51) Int. Cl.
*G06N 3/08* (2006.01)
*G06V 10/94* (2022.01)
*G06N 20/00* (2019.01)

(58) Field of Classification Search
CPC ........... G06N 3/09; G06N 20/00; G06N 3/02; G06N 3/084; G06N 3/0454; G06N 3/0445; G06N 3/004; G06V 10/955; G06V 10/82; G06V 20/40; G06T 2207/10028; G06Q 10/10
See application file for complete search history.

(56) References Cited

U.S. PATENT DOCUMENTS

| | | | | |
|---|---|---|---|---|
| 10,996,846 B2 * | 5/2021 | Robertson | ............ | G06F 1/1686 |
| 11,058,948 B1 * | 7/2021 | Hardiman | ............ | A63F 13/798 |
| 11,188,150 B2 * | 11/2021 | Kim | ....................... | G09B 19/24 |
| 2016/0231411 A1 * | 8/2016 | Kumar | ................. | G01S 3/7864 |
| 2017/0330091 A1 * | 11/2017 | Hawkins | ................ | G06N 20/00 |
| 2018/0032170 A1 * | 2/2018 | Shaik | ..................... | G06N 20/10 |
| 2019/0077023 A1 * | 3/2019 | Eto | ........................ | B25J 9/1612 |
| 2019/0332866 A1 * | 10/2019 | Beall | ..................... | G06T 19/003 |

FOREIGN PATENT DOCUMENTS

| | | | | | |
|---|---|---|---|---|---|
| CA | 3029411 | A1 * | 1/2018 | ............ | G06F 17/28 |
| CA | 3046966 | A1 * | 6/2018 | ........... | H04N 5/2226 |
| CA | 3103480 | A1 * | 12/2019 | ............... | E06B 7/28 |
| CA | 2942377 | C  * | 2/2020 | ............ | G06F 3/013 |
| CN | 104916184 | A  * | 9/2015 | ............ | G09B 23/28 |
| CN | 106997236 | A  * | 8/2017 | .............. | G06F 3/01 |
| CN | 108572765 | A  * | 9/2018 | .......... | G06F 3/0416 |
| CN | 108595047 | A  * | 9/2018 | | |
| CN | 109145903 | A  * | 1/2019 | ............ | G06K 9/036 |
| CN | 110325949 | A  * | 10/2019 | .......... | G06F 3/0418 |
| CN | 110377175 | A  * | 10/2019 | | |
| JP | 7061784 | B2 * | 5/2022 | ............ | B60R 1/066 |
| KR | 102192540 | B1 * | 8/2019 | .......... | G06F 3/0416 |
| SG | 10202000787 | | * | 3/2020 | ........... | B25J 11/009 |
| UA | 96456 | U  * | 7/2014 | | |
| WO | WO-2019076923 | A1 * | 4/2019 | ............ | G01N 3/068 |

* cited by examiner

| FC13 | FC14 | | | | | | |
|---|---|---|---|---|---|---|---|
| | | 3315 | 3249 | ..... | | 3003 | 2999 |
| | | 3282 | 3220 | ..... | | 2984 | 2978 |
| | F1 | ⋮ | ⋮ | | ⋮ | ⋮ | ⋮ |
| | | 3285 | 3211 | ..... | | 3118 | 3116 |
| 3323 | 3233 | | | ..... | | 3135 | 3127 |
| 3379 | 3267 | | | ..... | | 3138 | 3126 |

ELECTRONIC APPARATUS AND OBJECT INFORMATION RECOGNITION METHOD BY USING TOUCH DATA THEREOF

CROSS-REFERENCE TO RELATED APPLICATION

This application claims the priority benefit of Taiwan application serial no. 108137617, filed on Oct. 18, 2019. The entirety of the above-mentioned patent application is hereby incorporated by reference herein and made a part of this specification.

BACKGROUND

Technical Field

The invention relates to an electronic apparatus, and particularly relates to an electronic apparatus and an object information recognition method by using touch data thereof.

Description of Related Art

In today's information society, people's dependence on consumer electronic apparatuses is increasing. In order to be convenient and user-friendly, many electronic apparatuses may adopt a touch panel as an input device. In recent years, touch electronic products have become popular in the market because they are easy to operate and highly intuitive. However, regarding the current electronic products in the market, a touch screen integrated with a display is generally used to receive a touch event issued by a user's hand or a stylus, so that the electronic product may perform a subsequent operation according to the touch event. In addition to detecting the touch event issued by the user's hand or stylus, how to extend the touch sensing of the touch screen to other applications is also a concern for those skilled in the art.

SUMMARY

The invention is directed to an electronic apparatus and an object information recognition method by using touch data thereof, which are adapted to accurately recognize object information of a touch object above a touch panel.

An embodiment of the invention provides an object information recognition method by using touch data. The method includes following steps. Touch sensing is performed in the case where no object touches a touch panel to obtain a specific background frame through the touch panel. The specific background frame includes a plurality of first frame cells respectively corresponding to a plurality of touch sensing units, and the first frame cells respectively have touch background data. A current touch sensing frame is obtained through the touch panel. The current touch sensing frame includes a plurality of second frame cells respectively corresponding to the touch sensing units, and each of the second frame cells has touch raw data. Touch background data of the first frame cells in the specific background frame is respectively subtracted from touch raw data of the second frame cells in the current touch sensing frame to obtain a background removal frame including a plurality of cell values. The background removal frame is transformed into a touch sensing image. The touch sensing image is inputted to a trained neural network model to recognize object information of a touch object.

An embodiment of the invention provides an electronic apparatus including a touch panel, a storage device storing a plurality of instructions and a processor. The processor is coupled to the touch panel and the storage device. The processor is configured to execute the instructions to execute following steps. Touch sensing is performed in the case where no object touches a touch panel to obtain a specific background frame through the touch panel. The specific background frame includes a plurality of first frame cells respectively corresponding to a plurality of touch sensing units, and the first frame cells respectively have touch background data. A current touch sensing frame is obtained through the touch panel. The current touch sensing frame includes a plurality of second frame cells respectively corresponding to the touch sensing units, and each of the second frame cells has touch raw data. The touch background data of the first frame cells in the specific background frame is respectively subtracted from the touch raw data of the second frame cells in the current touch sensing frame to obtain a background removal frame including a plurality of cell values. The background removal frame is transformed into a touch sensing image. The touch sensing image is inputted to a trained neural network model to recognize object information of a touch object.

Based on the above description, in the embodiment of the invention, the current touch sensing frame sensed by the touch panel is transformed into a touch sensing image, and the object information of the touch object is recognized according to image features of the touch sensing image and the neural network. In this way, when the touch object contacts or is close to the touch panel, the electronic apparatus is capable of obtaining the object information of the touch object to execute other functions, so as to provide a new user operation experience and increase the functionality of the electronic apparatus.

To make the aforementioned more comprehensible, several embodiments accompanied with drawings are described in detail as follows.

BRIEF DESCRIPTION OF THE DRAWINGS

FIG. 3B is a schematic diagram of a touch sensing frame according to an embodiment of the invention.

DESCRIPTION OF THE EMBODIMENTS

Figure 1:
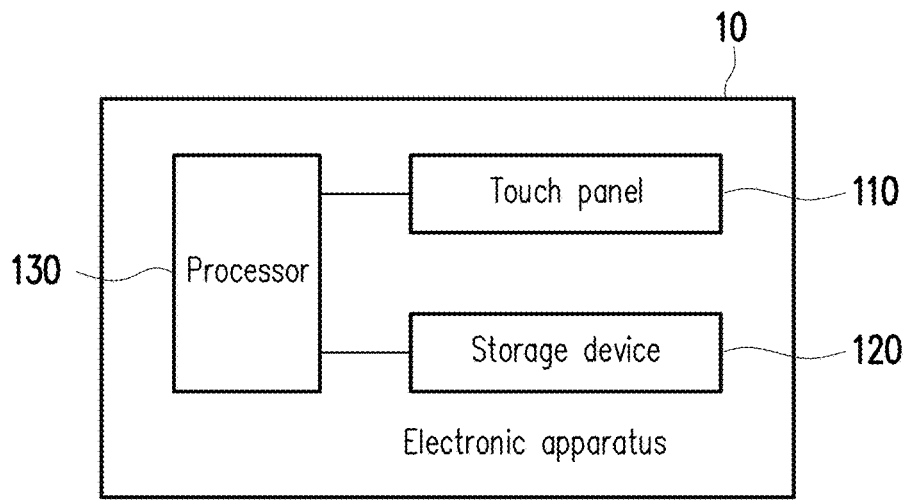
FIG. 1 is a schematic diagram of an electronic apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts. Theses exemplary embodiments are only a part of the disclosure, and the disclosure does not disclose all of the implementations. More precisely, these exemplary embodiments are only examples of the apparatus and method in the claims of the disclosure.

In the following embodiments, when a device is referred to be "connected" or "coupled" to another device, it may be directly connected or coupled to said another device, or other devices probably exist there between. In other words, unless otherwise specified, the terms "connection" and "coupling" include direct and indirect connection and coupling of two devices.

FIG. 1 is a schematic diagram of an electronic apparatus according to an embodiment of the invention, but it is only for convenience of description and the invention is not limited thereto. First, FIG. 1 introduces all the components and configuration relationships in the electronic apparatus. Detailed functions and operations will be disclosed with reference of FIG. 2.

Referring to FIG. 1, the electronic apparatus 10 of the embodiment is, for example, an electronic apparatus having a touch function such as a notebook computer, a smart phone, a tablet computer, an e-book, a game machine, etc., but the invention is not limited thereto. The electronic apparatus 10 includes a touch panel 110, a storage device 120 and a processor 130, and functions thereof are described below.

The touch panel 110 is, for example, a capacitive touch panel, a resistive touch panel, an electromagnetic touch panel or an optical touch panel, etc. In an embodiment, the touch panel 110 may be integrated with a display device (not shown) to form a touch screen. The display device is, for example, a Liquid Crystal Display (LCD), a Light-Emitting Diode (LED) display, a Field Emission Display (FED) or other types of display. The touch panel 110 includes a plurality of touch sensing units arranged in an array to implement touch sensing, so as to obtain a touch sensing frame including touch raw data respectively corresponding to the touch sensing units. For example, the capacitive touch panel includes a plurality of capacitive sensors. A frame size of the touch sensing frame is determined according to the number of the touch sensing units.

The storage device 120 is configured to store touch data, instructions, program codes, software modules, etc., which may be any type of a fixed or movable Random Access Memory (RAM), a Read-Only Memory (ROM), a flash memory, a hard disk or other similar device, an integrated circuit and a combination thereof.

The processor 130 is coupled to the touch panel 110 and the storage device 120, and is configured to control operations between the components of the electronic apparatus 10, and is, for example, a Central Processing Unit (CPU), or other programmable general purpose or special purpose microprocessor, a Digital Signal Processor (DSP), programmable controller, an Application Specific Integrated Circuits (ASIC), a Programmable Logic Device (PLD), a Graphics Processing Unit (GPU) or other similar device or a combination of the above devices. The processor 130 may execute the program codes, software modules, instructions, etc., stored in the storage device 120 to implement an object information recognition method by using touch data of the embodiment of the invention. It should be noted that in an embodiment, the touch panel 110 may be connected to the processor 130 through a touch IC.

However, in addition to the touch panel 110, the storage device 120 and the processor 130, the electronic apparatus 10 may further include other devices that are not illustrated in FIG. 1, such as a loudspeaker, a microphone, a display device, a camera, a communication module, a keyboard, etc., which is not limited by the invention.

Figure 2:
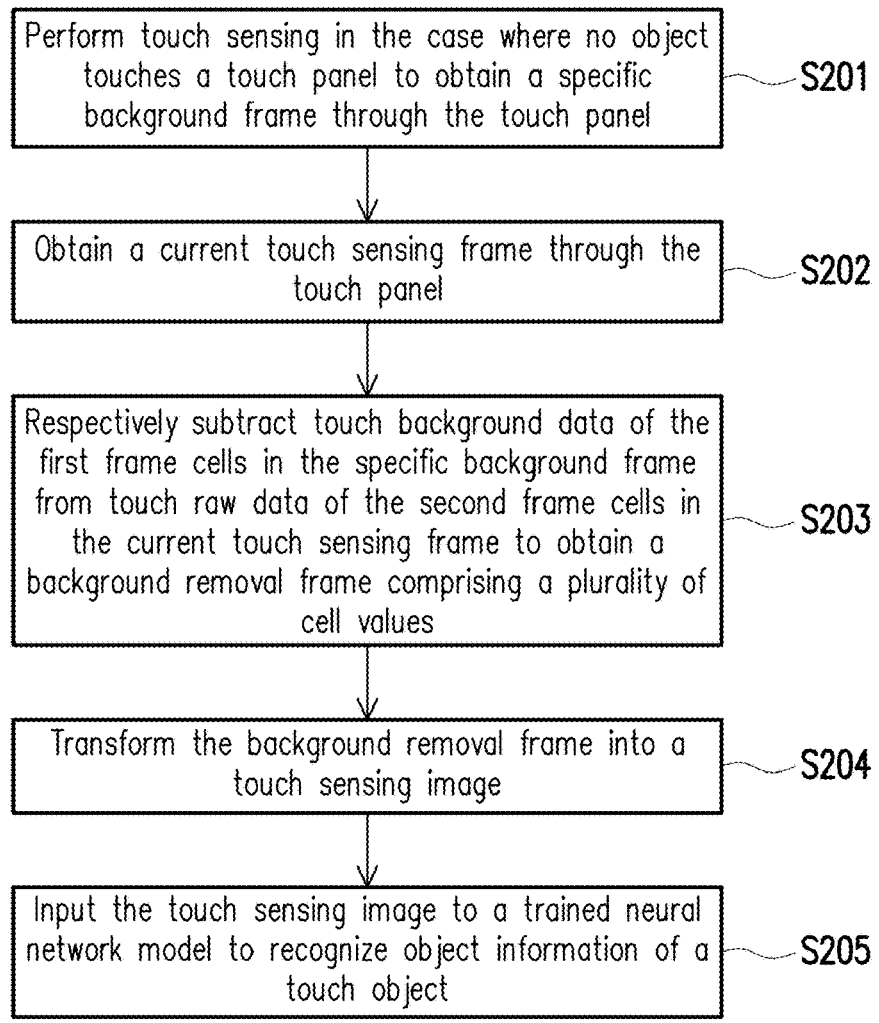
FIG. 2 is a flowchart illustrating an object information recognition method by using touch data according to an embodiment of the invention.

FIG. 2 is a flowchart illustrating an object information recognition method by using touch data according to an embodiment of the invention. Referring to FIG. 1 and FIG. 2, the method of the embodiment is adapted to the electronic apparatus 10 of FIG. 1, and a detailed flow of the method of the embodiment is introduced below with reference of various components of the electronic apparatus 10.

In a step S201, the touch panel 110 performs touch sensing in the case where no object touches the touch panel 110, and the processor 130 obtains a specific background frame through the touch panel 110. The specific background frame includes a plurality of frame cells (i.e. first frame cells) respectively corresponding to a plurality of touch sensing units, and the frame cells in the specific background frame respectively have touch background data. The number of the frame cells in the specific background frame is determined according to the number of the plurality of touch sensing units of the touch panel 110. The specific background frame is determined by touch raw data generated through touch sensing in the case where no object touches the touch panel 110.

To be specific, in an embodiment, at least one initial touch sensing frame is obtained through the touch panel 110 in the case where no object touches the touch panel 110, and the processor 130 may obtain the specific background frame according to the at least one initial touch sensing frame. Further, in an embodiment, the touch background data in the specific background frame may be generated by performing statistical processing on the touch raw data in a plurality of initial touch sensing frames, and the above statistical processing is, for example, averaging processing, etc. Alternatively, in an embodiment, the touch background data in the specific background frame may also be the touch raw data in a single initial touch sensing frame. It should be noted that these initial touch sensing frames are all generated by the touch panel 110 through touch sensing in the case where no object touches the touch panel 110.

In a step S202, the processor 130 obtains a current touch sensing frame through the touch panel 110. The current touch sensing frame includes a plurality of frame cells (i.e. second frame cells) respectively corresponding to the touch sensing units, and each of the frame cells in the current touch sensing frame has touch raw data. In other words, the number of the touch raw data is determined according to the number of the touch sensing units of the touch panel 110. For example, it is assumed that the touch panel 110 has m*n touch sensing units, the current touch sensing frame then includes m*n frame cells respectively corresponding to m*n batches of touch raw data. It should be noted that a touch integrated circuit (IC) or other processing circuit in the electronic apparatus 10 may compare the touch raw data with a filter threshold value to filter the touch raw data smaller than the filter threshold value, so as to detect a touch event occurred on the touch panel 110. However, in an embodiment, the processor 130 obtains the touch raw data that is not subjected to the filtering processing. Namely, each of the frame cells in the current touch sensing frame obtained by the processor 130 has the touch raw data generated by the touch panel 110.

Figure 3A:
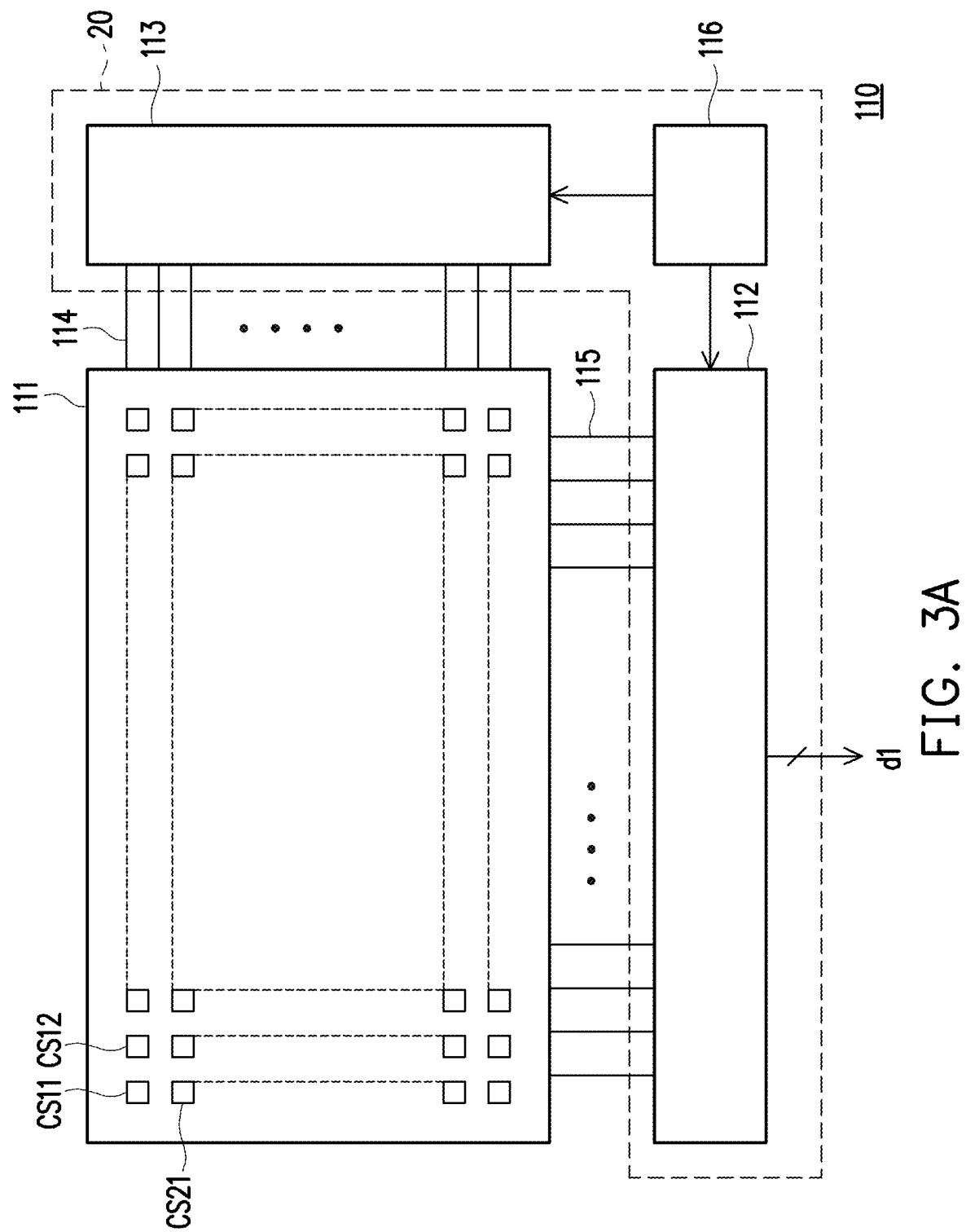
FIG. 3A is a schematic diagram of a touch panel according to an embodiment of the invention.

Further, FIG. 3A is a schematic diagram of a touch panel according to an embodiment of the invention. FIG. 3B is a schematic diagram of a touch sensing frame according to an embodiment of the invention. In FIG. 3A and FIG. 3B, a capacitive touch panel is taken as an example for description. Referring to FIG. 3A first, the touch panel 110 may include a sensing device array 111 and a touch sensing circuit 20, and the sensing device array 111 includes a plurality of touch sensing units (for example, touch sensing units CS11, CS12, CS21) arranged in an array. The touch sensing circuit 20 includes a scan driving circuit 113, a receiving sensing circuit 112, a timing generating circuit 116, etc. The scan driving circuit 113 applies a driving signal to the touch sensing units row by row through scan lines (for example, a scan line 114). The receiving sensing circuit 112 senses charge change amounts of the touch sensing units through sensing lines (for example, a sensing line 115), so as to receive touch sensing signals and output touch raw data d1. The receiving sensing circuit 112 may use Analog-to-Digital Converters (ADC) to convert the touch sensing signals generated by the touch sensing units into the digital touch raw data d1 for outputting. In other words, in an embodiment, the receiving sensing circuit 112 may include a sensor driving circuit and a touch controller.

Referring to FIG. 3B, the current touch sensing frame F1 includes a plurality of frame cells (for example, frame cells FC11, FC12, FC21) respectively corresponding to the plurality of touch sensing units (for example, the touch sensing units CS11, CS12, CS21). For example, it is assumed that the touch panel 110 has 44*76 touch sensing units, the current touch sensing frame F1 then includes 44*76 frame cells. Moreover, each frame cell has the corresponding touch raw data. For example, the frame cell FC11 has touch raw data "3379"; the frame cell FC12 has touch raw data "3323"; and the frame cell FC21 has touch raw data "3267". In other words, the current touch sensing frame F1 may also be regarded as a 44*76 data array, and array elements in the data array are the touch raw data. However, FIG. 3B is for illustrative purposes only, and the numerical values shown therein are all examples and are not intended to limit the invention.

In a step S203, the processor 130 respectively subtracts the touch background data of the first frame cells in the specific background frame from the touch raw data of the second frame cells in the current touch sensing frame to obtain a background removal frame including a plurality of cell values. In other words, the background removal frame also includes a plurality of frame cells, and the frame cells in the background removal frame respectively have the corresponding cell value. The cell value located at a cell position (i,j) in the background removal frame is generated by subtracting the touch background data located at the cell position (i,j) in the specific background frame from the touch raw data located at the cell position (i,j) in the current touch sensing frame. The cell position (i,j) represents an array position of an $i^{th}$ row and $j^{th}$ column.

Namely, by performing the subtraction operation between the current touch sensing frame and the specific background frame to calculate the cell values in the background removal frame, the processor 130 may filter a touch sensing noise component in the current touch sensing frame to some extent. In this way, the adverse effect of the touch sensing noise on the subsequent image recognition may be reduced. The touch sensing noise may be caused by a manufacturing process of the touch panel 110, a disposing manner of the touch panel 110 disposed on the electronic apparatus 10, environmental factors, or other factors. In other words, the background removal frame may also be regarded as a result of the processor 130 performing some denoising processing on the current touch sensing frame.

In a step S204, the processor transforms the background removal frame into a touch sensing image. Based on a specific image format specified by a trained neural network model, processor 130 may image the background removal frame into a grayscale image or a color image (i.e., the touch sensing image) that conforms to the specific image format described above. For example, the processor 130 may generate the grayscale image of N-bits according to the background removal frame. In an embodiment, the processor 130 requires to transform the cell values in the background removal frame into values between a grayscale interval $0\sim(2^N-1)$. For example, a normalization operation may be used to normalize a value range of the cell values in the background removal frame. Moreover, in an embodiment, if the subsequent image processing has a special requirement on image size, the processor 130 may also perform zoom processing and/or fill redundant image blocks to make the size of the touch sensing image conform to the specific image format specified by the trained neural network model.

In a step S205, the processor 130 inputs the touch sensing image to a trained neural network model to recognize object information of a touch object. In an embodiment, the processor 130 may input the touch sensing image to a trained neural network model to recognize the object information of the touch object through the trained neural network model. The object information includes an object type, an object model, an object position, positions of components of the touch object or other information, etc. In other words, by making the touch object to touch the touch object or be close enough to the touch panel, the touch sensing image may be used to recognize the related information of the touch object. The touch object may be a handheld electronic device, a wearable electronic device or other object that may cause a change in the touch sensing result of the touch sensing units. For example, the processor 130 may recognize which type of mobile phone the touch object is. Alternatively, the processor 130 may recognize whether the touch object is a mobile phone, or the processor 130 may recognize a camera position of the touch object.

In an embodiment, the trained neural network model is a machine learning model pre-constructed based on training image sets for deep learning, which may be stored in the storage device 120. In other words, model parameters of the trained neural network model (for example, the number of neural network layers and a weight of each neural network layer, etc.) have been determined by prior training and stored in the storage device 120. When the touch sensing image is input to the trained neural network model, the trained neural network model first performs feature extraction to generate feature vectors. Thereafter, the feature vectors are input to a classifier in the trained neural network model, and the classifier classifies the feature vectors to recognize the object information of the touch object in the touch sensing image. The trained neural network model may be R-CNN, Fast R-CNN, Faster R-CNN, Yolo or SSD, etc., in a Convolution Neural Network (CNN) model used for object detection, which is not limited by the invention. It should be noted that in an embodiment, the training image set used for training the trained neural network model may also be generated in a method similar to the steps S201-S204, which will be described later.

Figure 4:
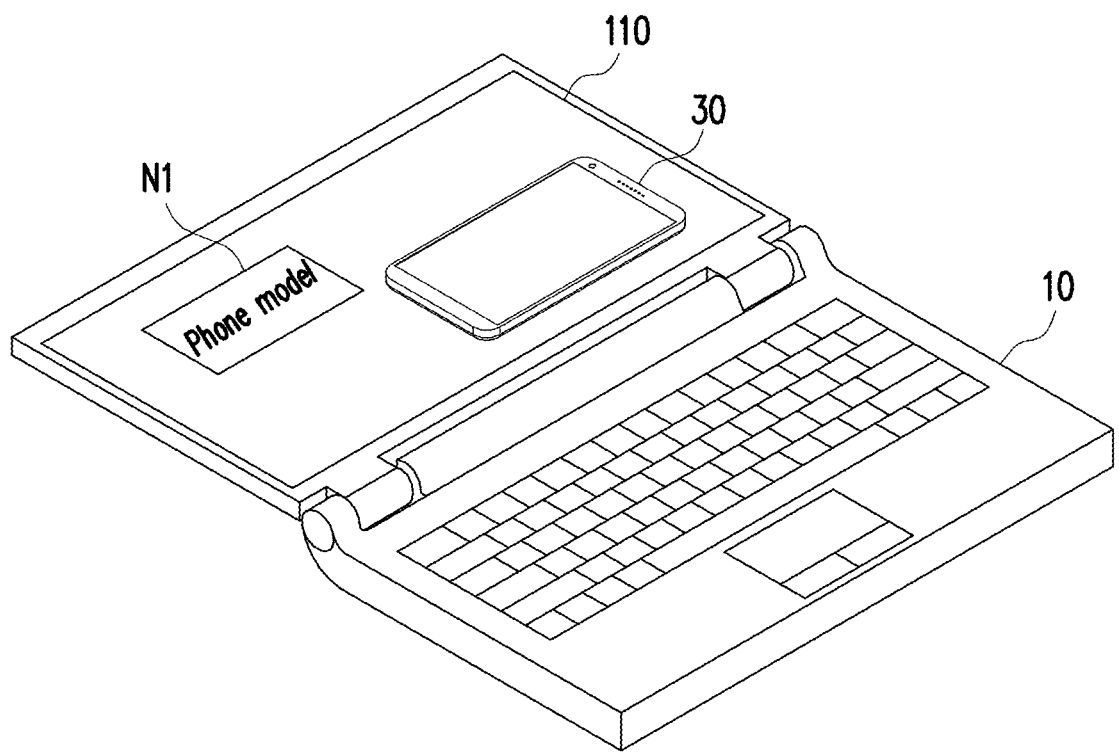
FIG. 4 is a schematic diagram of a situation of an object information recognition method by using touch data according to an embodiment of the invention.

FIG. 4 is a schematic diagram of a situation of an object information recognition method by using touch data according to an embodiment of the invention. Referring to FIG. 4, the touch panel 110 of the electronic apparatus 10 and a display device are integrated into a touch screen. When the touch object 30 (for example, a mobile phone) is placed on top of the touch screen, the processor 130 may obtain a current touch sensing frame generated by the touch panel 110 in a frame period. Then, the processor 130 may subtract the specific background frame from the current touch sensing frame to generate a background removal frame, and transform the background removal frame into a touch sensing image. In this way, in the exemplary embodiment, the processor 130 may use the trained neural network model and the touch sensing image to recognize a phone model of the touch object 30, and displays a notification information N1 including the phone model on the touch screen. In detail, in an embodiment, the touch raw data sensed by the touch sensing units reacts with approaching of internal/external components of the touch object 30 and a casing of the touch panel to generate corresponding charge changes, so that the touch sensing image carries the feature information of the touch object 30, and the feature information of the touch object 30 may be recognized based on the touch sensing image. For example, a metal component configuration inside a mobile phone 'model A' is not the same as a metal component configuration inside a mobile phone 'model B'. Therefore, the image feature of the touch sensing image generated by placing the mobile phone "model A" on the touch panel 110 is different from the image feature of another touch sensing image generated by placing a mobile phone "model B" on the touch panel 110.

Figure 5:
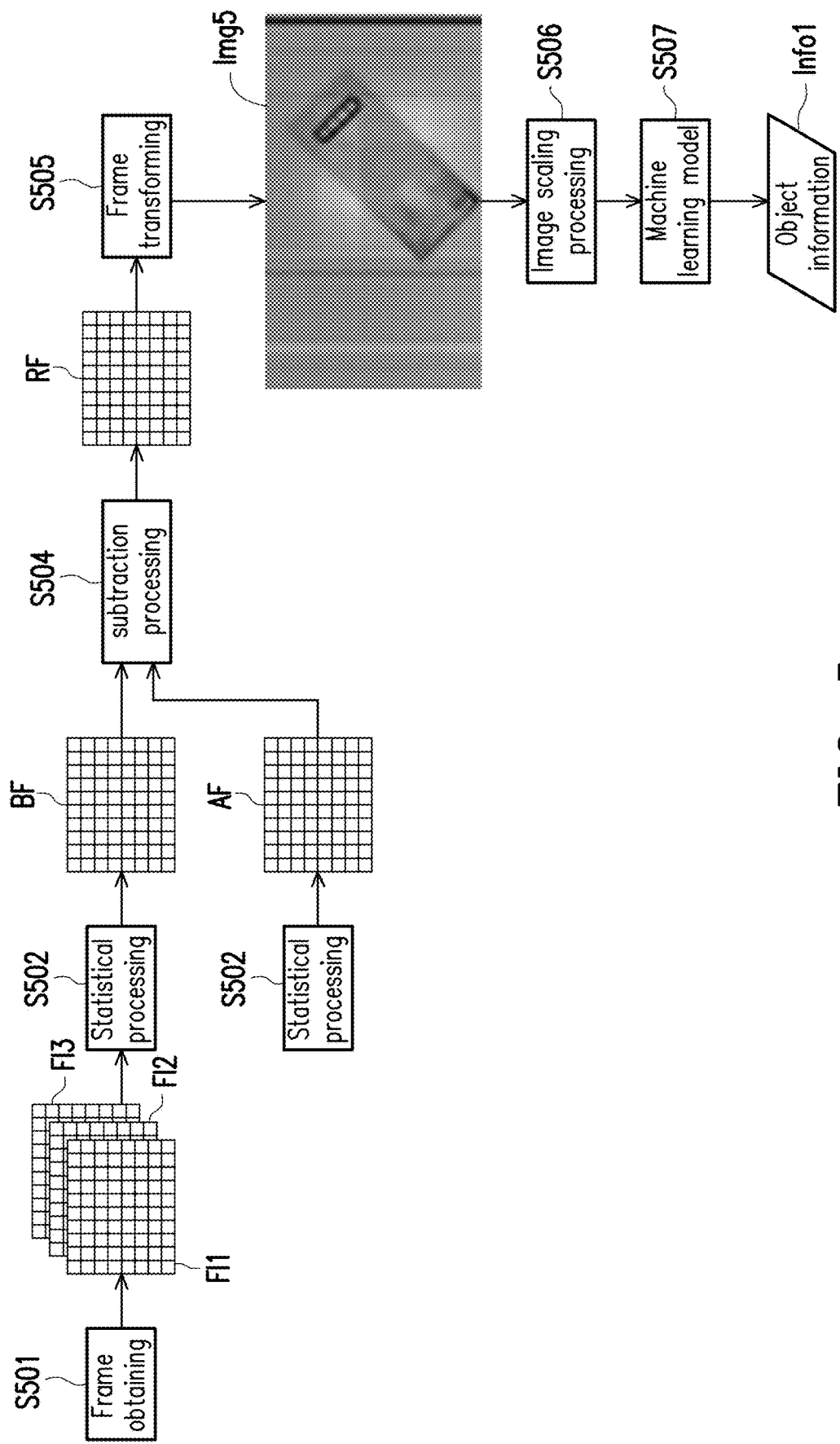
FIG. 5 is a flowchart illustrating an object information recognition method by using touch data according to an embodiment of the invention.

However, the implementation of the invention is not limited to the above description, and the content of the above embodiment may be changed or extended according to an actual requirement. In order to clearly convey the spirit of the invention, an embodiment is further provided below with reference of various components of the electronic apparatus 10 of FIG. 1. FIG. 5 is a flowchart illustrating an object information recognition method by using touch data according to an embodiment of the invention.

Referring to FIG. 1 and FIG. 5, in a step S501, in the case where no object touches the touch panel 110, the processor 130 obtains a plurality of initial touch sensing frames FI1-FI3 from the touch panel 110, and the initial touch sensing frames FI1-FI3 respectively include touch raw data generated by each of the touch sensing units on the touch panel 110. In FIG. 5, three initial touch sensing frames FI1-FI3 are taken as an example for description, but the number of the initial touch sensing frames is not limited by the invention.

In a step S502, the processor 130 performs statistical processing on the touch raw data of a plurality of frame cells (i.e. third frame cells) located at the same cell positions in the initial touch sensing frames FI1-FI3 to generate a specific background frame BF including touch background data corresponding to each of the frame cells (the first frame cells). In an embodiment, the statistical processing is, for example, averaging processing, or other statistical processing such as median acquisition, etc. To be specific, the processor 130 may obtain corresponding three batches of touch raw data from the initial touch sensing frames FI1-FI3 for each cell position, and take an average of the three batches of touch raw data as the touch background data located at the same cell position in the specific background frame BF.

Figure 6:
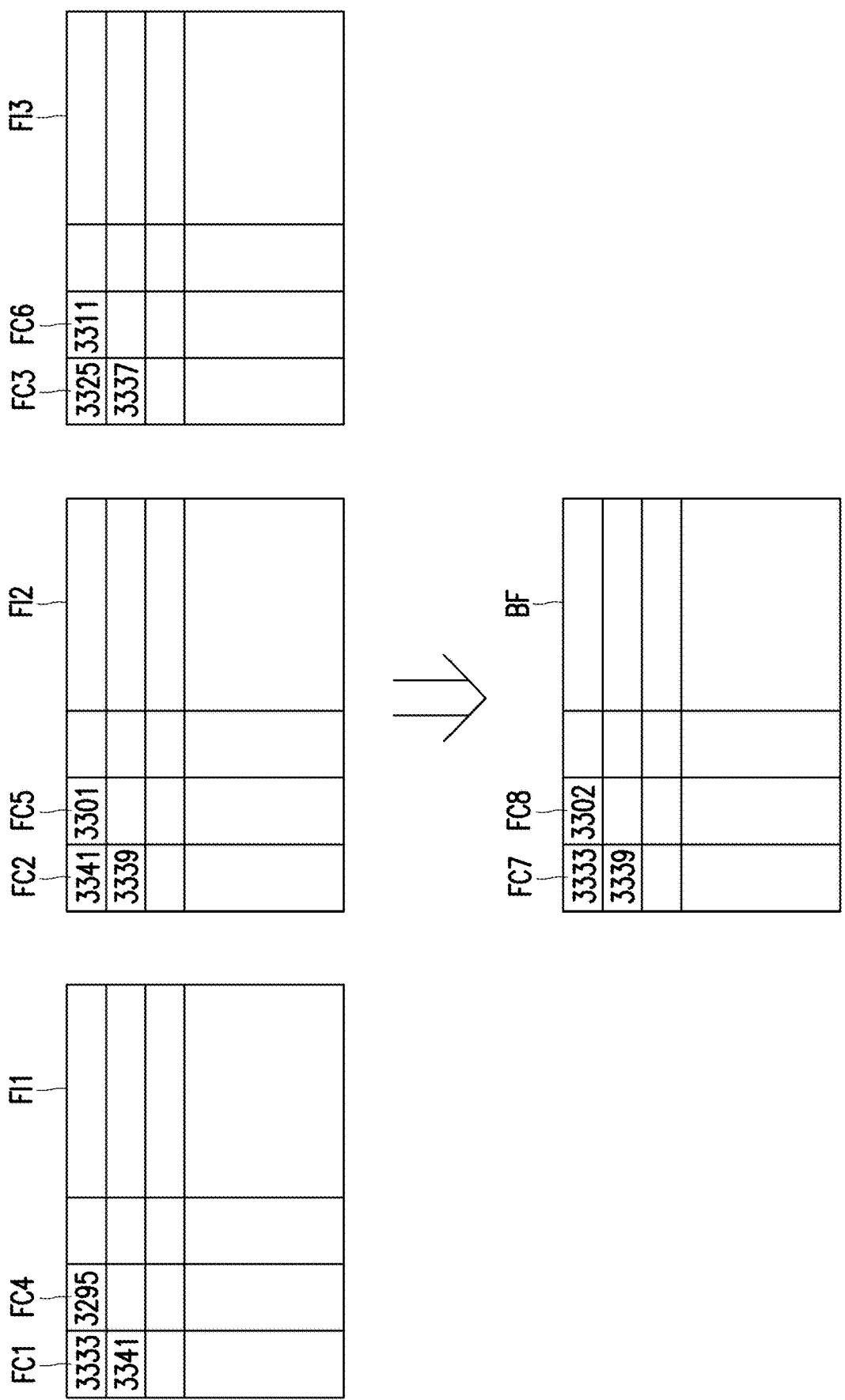
FIG. 6 is a schematic diagram of obtaining a specific background frame according to an embodiment of the invention.

For example, FIG. 6 is a schematic diagram of obtaining the specific background frame according to an embodiment of the invention. Referring to FIG. 6, regarding a cell position of a first row and a first column, the processor 130 may respectively obtain three batches of touch raw data '3333', '3341', '3325' corresponding to the frame cells FC1, FC2, and FC3 from the initial touch sensing frame frames FI1-FI3. Then, the processor 130 calculates an average of the three batches of touch raw data '3333', '3341', '3325' to obtain the touch background data '3333' corresponding to the frame cell FC7 in the specific background frame BF. Similarly, regarding a cell position of a first row and a second column, the processor 130 may respectively obtain three batches of touch raw data '3295', '3301', '3311' corresponding to the frame cells FC4, FC5, and FC6 from the initial touch sensing frame frames FI1-FI3. Then, the processor 130 calculates an average of the three batches of touch raw data '3295', '3301', '3311' to obtain the touch background data '3302' corresponding to the frame cell FC8 in the specific background frame BF based on an integer part of the average. Deduced by analogy, the processor 130 may obtain the touch background data of each frame cell in the specific background frame BF. However, the values shown in FIG. 6 are only an example, and are not used for limiting the invention.

In a step S503, the processor 130 obtains a current touch sensing frame AF from the touch panel 110, where the current touch sensing frame AF includes touch raw data generated by each of the touch sensing units on the touch panel 110. In a step S504, the processor 130 performs a subtraction processing on the current touch sensing frame AF and the specific background frame BF to generate the background removal frame RF. To be specific, regarding each cell position, the processor 130 may subtract the touch background data in the specific background frame BF from the touch raw data in the current touch sensing frame AF, and takes the subtraction result as a cell value of the same cell position in the background removal frame RF.

Figure 7:
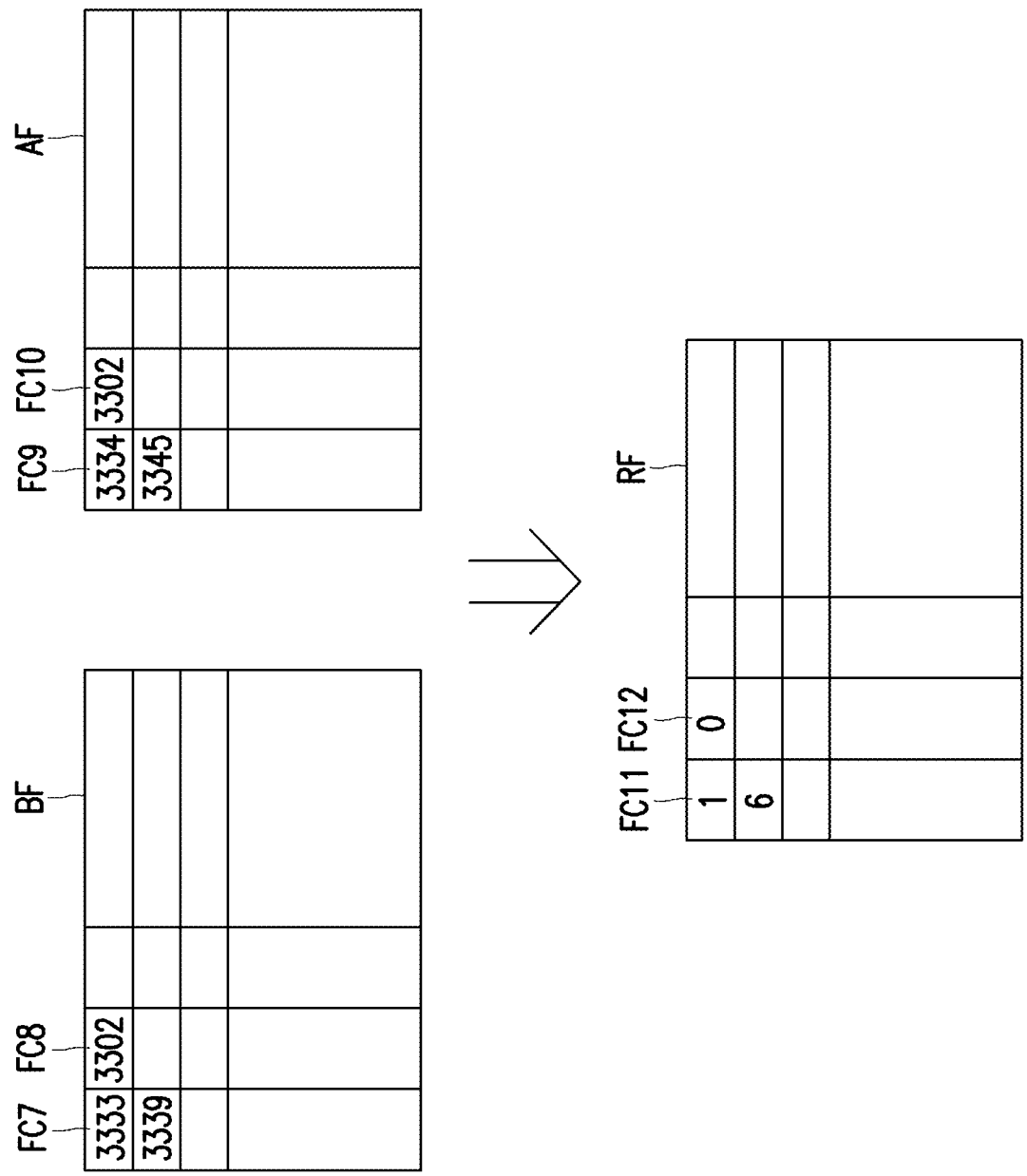
FIG. 7 is a schematic diagram of a background removal frame according to an embodiment of the invention.

For example, FIG. 7 is a schematic diagram of a background removal frame according to an embodiment of the invention. Referring to FIG. 7, regarding a cell position of a first row and a first column, the processor 130 may obtain the touch background data '3333' corresponding to the frame cell FC7 from the specific background frame BF, and obtain the touch raw data '3334' corresponding to the frame cell FC9 from the current touch sensing frame AF. Then, the processor 130 subtracts the touch background data '3333' corresponding to the frame cell FC7 from the touch raw data '3334' corresponding to the frame cell FC9 to obtain a cell value '1' corresponding to the frame cell FC11 in the background removal frame RF. Similarly, regarding a cell position of a first row and a second column, the processor 130 may obtain the touch background data '3302' corresponding to the frame cell FC87 from the specific background frame BF, and obtain the touch raw data '3302' corresponding to the frame cell FC10 from the current touch sensing frame AF. Then, the processor 130 subtracts the touch background data '3302' corresponding to the frame cell FC8 from the touch raw data '3302' corresponding to the frame cell FC10 to obtain a cell value '0' corresponding to the frame cell FC12 in the background removal frame RF. Deduced by analogy, the processor 130 may obtain the cell value of each frame cell in the background removal frame RF. However, the values shown in FIG. 7 are only an example, and are not used for limiting the invention. In an embodiment, since the touch sensing noise in the background removal frame RF has been filtered to some extent, the touch sensing image generated based on the background removal frame RF may more accurately describe the object features of the touch object. Therefore, the recognition accuracy of the object information recognition based on the touch sensing image may be improved.

Referring back to the flow of FIG. 5, in a step S505, the processor 130 transforms the background removal frame RF into a touch sensing image Img5. For example, the touch sensing image Img5 is, for example, a grayscale image of 8-bits, each cell value in the background removal frame RF may be adjusted to a grayscale value between 0 and 255. In an embodiment, the processor 130 obtains the minimum cell value of the cell values in the background removal frame RF. Then, the processor 130 subtracts the minimum cell value from each of the cell values in the background removal frame RF to generate a plurality of pixels of the touch sensing image Img5. For example, it is assumed that the minimum cell value in the background removal frame RF is '5', the processor 130 subtracts 5 from each of the cell values in the background removal frame RF, and generates the touch sensing image Img5 according to the result of subtracting the minimum cell value. Alternatively, in an embodiment, the processor 130 performs a numerical normalization operation on each of the cell values in the background removal frame RF to generate the plurality of pixels of the touch sensing image Img5. The processor 130 may normalize the cell values in the background removal frame RF according to the maximum cell value and the minimum cell value in the background removal frame RF, so as to generate pixel values of the touch sensing image Img5.

Then, in a step S506, the processor 130 performs an image enlarging processing on the touch sensing image Img5 according to an image size specified by the trained neural network model. In an embodiment, the image size specified by the trained neural network model is W*H, and W and H are respectively powers of 2. For example, it is assumed that the touch panel 110 includes 44*76 touch sensing units, the background removal frame RF then includes 44*76 frame cells and the touch sensing image img5 without scaling includes 44*76 pixels. Then, the processor 130 enlarges the touch sensing image Img5 including 44*76 pixels into a touch sensing image including 128*128 pixels. In this way, in the case that the number of the touch sensing units of the touch panel 110 is generally limited, by performing the image enlarging processing on the touch sensing image Img5, the recognition accuracy of the trained neural network model may be improved.

Finally, in a step S507, the processor 130 may input the touch sensing image Img5 subjected to the enlarging processing into the trained neural network model to recognize a position of the touch object relative to the touch panel 110 and the object information Info1 of the touch object. The object information Info1 may include an object type, an object position, an object model, or component positions and component type of internal components. To be specific, the output of the trained neural network model includes an object class, an object position and an object classification probability of the touch object. Configuration of the object class may be determined according to an actual application requirement. For example, the trained neural network model is a CNN, the trained neural network model is composed of at least one convolution layer, at least one pooling layer, at least one fully connected layer and an output layer. The convolution layer and the pooling layer are connected with each other, and are used as feature extraction of image to obtain the feature values (which are also referred to as feature vector) of the touch sensing image img5. The fully connected layer and the output layer classify the image object in the touch sensing image img5 according to the feature values generated by the convolution layer and the pooling layer, and obtain the corresponding object information. For example, the processor 130 may recognize a device model of the touch object or recognize a camera lens position of the touch object, etc., according to the touch sensing image Img5.

It should be noted that in an embodiment, the trained neural network model may be generated based on another specific background frame generated by another touch panel. Namely, another electronic device used for training a neural network to produce the trained neural network model includes the other touch panel described above. Therefore, since the touch sensing noise is also filtered when the neural network is trained, the trained neural network model may be applied to different touch electronic apparatuses and maintain certain recognition accuracy. Further, the touch sensing noise of different touch electronic apparatus is different, but since the background noise filtering processing (i.e. the operation of subtracting the specific background frame) is carried out in both neural network model training and actual use of the trained neural network model, the recognition accuracy of the trained neural network model may be improved.

Figure 8:
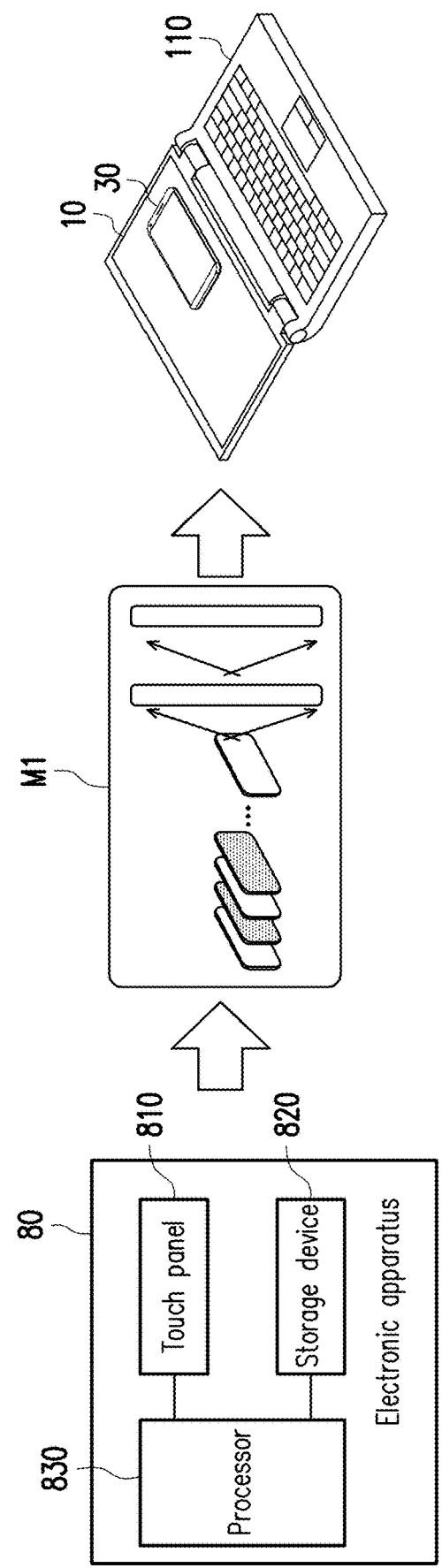
FIG. 8 is a schematic diagram of an object information recognition system according to an embodiment of the invention.

FIG. 8 is a schematic diagram of an object information recognition system according to an embodiment of the invention. The object information recognition system S1 includes an electronic apparatus 80 for training the neural network and generating the trained neural network model M1, and an electronic apparatus 10 for performing object recognition by using the trained neural network model M1. The trained neural network model M1 includes a neural network framework and a weight parameter. The hardware and operation of the electronic apparatus 10 are as that described in the aforementioned embodiment, and details thereof are not repeated.

It should be noted that the electronic apparatus 80 includes a touch panel 810, a storage device 820 and a processor 830. However, functions and coupling relationships of the touch panel 810, the storage device 820 and the processor 830 are similar to the touch panel 110, the storage device 120 and the processor 130 of the electronic apparatus 10, and details thereof are not repeated.

Figure 9:
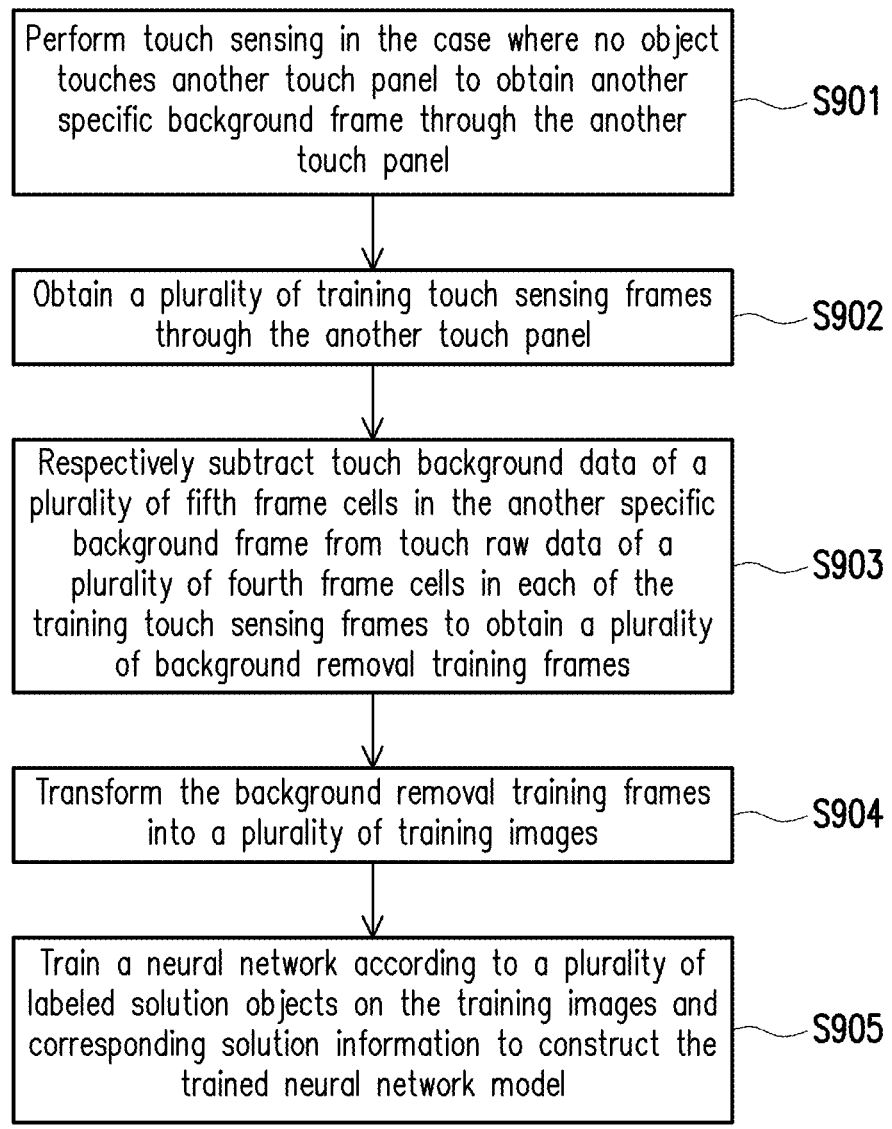
FIG. 9 is a flowchart illustrating a method for training a neural network by using touch data according to an embodiment of the invention.

FIG. 9 is a flowchart illustrating a method for training a neural network by using touch data according to an embodiment of the invention. Referring to FIG. 8 and FIG. 9, the method of the embodiment is adapted to the object information recognition system S1 of FIG. 8, and a detailed flow of the method of the embodiment is described below with reference of various components of the object information recognition system S1.

In a step S901, the touch panel 810 performs touch sensing in the case where no object touches the other touch panel 810 to obtain another specific background frame through the other touch panel 810. In an embodiment, the other specific background frame obtained through the other touch panel 810 is different from the specific background frame obtained through the touch panel 110. In a step S902, the processor 830 obtains a plurality of training touch sensing frames through the other touch panel 810. In a model training phase, the training touch sensing frames are generated by placing at least one known object on the touch panel 810 to perform touch sensing. For example, mobile phones of a plurality of different models may be placed on the touch panel 810 to generate the training touch sensing frames.

In a step S903, the processor 830 respectively subtracts touch background data of a plurality of fifth frame cells in another specific background frame from touch raw data of a plurality of fourth frame cells in each of the training touch sensing frames to obtain a plurality of background removal training frames. In a step S904, the processor 830 transforms the background removal training frames into a plurality of training images. The data pre-processing of the step S903 and the step S904 is similar to the data pre-processing of the step S203 and the step S204. In other words, the training image set used for training the neural network is also generated in a manner similar to the steps S204-S204.

Moreover, in the model training phase, solution objects in these training images have all been selected and assigned with solution information. In a step S905, the processor 830 trains the neural network according to labeled multiple solution objects on the training images and the corresponding solution information to construct the trained neural network model M1. To be specific, the processor 112 may input the training images to the neural network model one by one, and calculate an error by comparing an output of the neural network model generated according to the training images and the solution information of the solution object. Then, a weight of each network layer in the network is adjusted by means of inverse transmission according to the error. A method of calculating the error (i.e. a loss function) is, for example, square difference or Softmax etc. Therefore, the processor 112 gradually trains a set of rules that may be used to detect objects (i.e. the weight of the trained neural network model M1), and finally construct the trained neural network model M1. Therefore, the electronic apparatus 10 may recognize the object information of the touch object 30 according to the trained neural network model M1.

In summary, in the embodiments of the invention, the touch raw data in the touch sensing frame may be used to recognize the object information of the touch object, and is not only used for detecting a touch gesture or an input of a stylus. By making the touch object to touch or close enough to the touch panel, the electronic apparatus may accurately recognize the related object information of the touch object, so as to use the related object information of the touch object to execute other subsequent applications. In this way, the user may implement other applications of the electronic apparatus through a more intuitive operation method, so as to improve the convenience of operating the electronic apparatus. Moreover, by performing denoising processing on the touch sensing frame, the adverse effects of the touch sensing noise on image recognition may be eliminated, and the recognition accuracy of the neural network model may be improved. Namely, when the touch data and the neural network are used to recognize the object information, the embodiment of the invention provides the suitable data pre-processing, so as to improve the recognition accuracy of the neural network model. Moreover, by using the touch data and the neural network to recognize the object information, related information of the components of the touch object may also be recognized.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. An object information recognition method by using touch data, comprising:
    performing touch sensing in the case where no object touches a touch panel to obtain a specific background frame through the touch panel, wherein the specific background frame comprises a plurality of first frame cells respectively corresponding to a plurality of touch sensing units, and the first frame cells respectively have touch background data;
    obtaining a current touch sensing frame through the touch panel, wherein the current touch sensing frame comprises a plurality of second frame cells respectively corresponding to the touch sensing units, and each of the second frame cells has touch raw data;
    respectively subtracting the touch background data of the first frame cells in the specific background frame from the touch raw data of the second frame cells in the current touch sensing frame to obtain a background removal frame comprising a plurality of cell values;
    transforming the background removal frame into a touch sensing image; and
    inputting the touch sensing image to a trained neural network model to recognize object information of a touch object, wherein the object information comprises an object type and an object model,
    wherein the step of performing touch sensing in the case where no object touches the touch panel to obtain the specific background frame through the touch panel comprises:
    obtaining a plurality of initial touch sensing frames through the touch panel in the case where no object touches the touch panel; and
    performing statistical processing on touch raw data of a plurality of third frame cells located at the same cell position in the initial touch sensing frames, so as to generate the specific background frame comprising the touch background data of the first frame cells,
    wherein the trained neural network model is generated based on another specific background frame generated by another touch panel, and the method further comprising:
    performing touch sensing in the case where no object touches the another touch panel to obtain the another specific background frame through the another touch panel;
    obtaining a plurality of training touch sensing frames through the another touch panel;
    respectively subtracting touch background data of a plurality of fifth frame cells in the another specific background frame from touch raw data of a plurality of fourth frame cells in each of the training touch sensing frames to obtain a plurality of background removal training frames;
    transforming the background removal training frames into a plurality of training images; and
    training a neural network according to a plurality of labeled solution objects on the training images and corresponding solution information to construct the trained neural network model.

2. The object information recognition method by using touch data as claimed in claim 1, wherein the step of transforming the background removal frame into the touch sensing image comprises:
    obtaining a minimum cell value of the cell values in the background removal frame; and
    subtracting the minimum cell value from each of the cell values in the background removal frame to generate a plurality of pixels of the touch sensing image.

3. The object information recognition method by using touch data as claimed in claim 1, wherein the step of transforming the background removal frame into the touch sensing image comprises:

performing a numerical normalization operation on each of the cell values in the background removal frame to generate a plurality of pixels of the touch sensing image.

4. The object information recognition method by using touch data as claimed in claim 1, wherein the step of inputting the touch sensing image to the trained neural network model to recognize the object information of the touch object comprises:

performing an image enlarging processing on the touch sensing image according to an image size specified by the trained neural network model, wherein the image size is W*H, and W and H are respectively powers of 2.

5. The object information recognition method by using touch data as claimed in claim 1, wherein the trained neural network model is a Convolution Neural Network (CNN) model.

6. An electronic apparatus, comprising:

a touch panel, comprising a plurality of touch sensing units;

a storage device, storing a plurality of instructions; and a processor, coupled to the touch panel and the storage device, and configured to execute the instructions to:

perform touch sensing in the case where no object touches the touch panel to obtain a specific background frame through the touch panel, wherein the specific background frame comprises a plurality of first frame cells respectively corresponding to the touch sensing units, and the first frame cells respectively have touch background data;

obtain a current touch sensing frame through the touch panel, wherein the current touch sensing frame comprises a plurality of second frame cells respectively corresponding to the touch sensing units, and each of the second frame cells has touch raw data;

respectively subtract the touch background data of the first frame cells in the specific background frame from the touch raw data of the second frame cells in the current touch sensing frame to obtain a background removal frame comprising a plurality of cell values;

transform the background removal frame into a touch sensing image; and input the touch sensing image to a trained neural network model to recognize object information of a touch object, wherein the object information comprises an object type and an object model, wherein the processor is further configured to:

obtain a plurality of initial touch sensing frames through the touch panel in the case where no object touches the touch panel; and perform statistical processing on touch raw data of a plurality of third frame cells located at the same cell position in the initial touch sensing frames, so as to generate the specific background frame comprising the touch background data of the first frame cells, wherein the trained neural network model is generated based on another specific background frame generated by another touch panel, and the processor is further configured to:

perform touch sensing in the case where no object touches the another touch panel to obtain the another specific background frame through the another touch panel;

obtain a plurality of training touch sensing frames through the another touch panel;

respectively subtract touch background data of a plurality of fifth frame cells in the another specific background frame from touch raw data of a plurality of fourth frame cells in each of the training touch sensing frames to obtain a plurality of background removal training frames;

transform the background removal training frames into a plurality of training images; and train a neural network according to a plurality of labeled solution objects on the training images and corresponding solution information to construct the trained neural network model.

7. The electronic apparatus as claimed in claim 6, wherein the processor is further configured to:

obtain a minimum cell value of the cell values in the background removal frame; and subtract the minimum cell value from each of the cell values in the background removal frame to generate a plurality of pixels of the touch sensing image.

8. The electronic apparatus as claimed in claim 6, wherein the processor is further configured to:

perform a numerical normalization operation on each of the cell values in the background removal frame to generate a plurality of pixels of the touch sensing image.

9. The electronic apparatus as claimed in claim 6, wherein the processor is further configured to:

perform an image enlarging processing on the touch sensing image according to an image size specified by the trained neural network model, wherein the image size is W*H, and W and H are respectively powers of 2.

10. The electronic apparatus as claimed in claim 6, wherein the trained neural network model is a Convolution Neural Network (CNN) model.

* * * * *